Dec. 22, 1942. E. M. FERGUSON ET AL 2,306,158
VARIABLE SPEED TRANSMISSION AND AUTOMATIC TORQUE COMPENSATOR
Filed Oct. 25, 1939 3 Sheets-Sheet 1

Edwin M. Ferguson
Albert W. Barton
INVENTOR.

BY Howard Gieher
ATTORNEYS

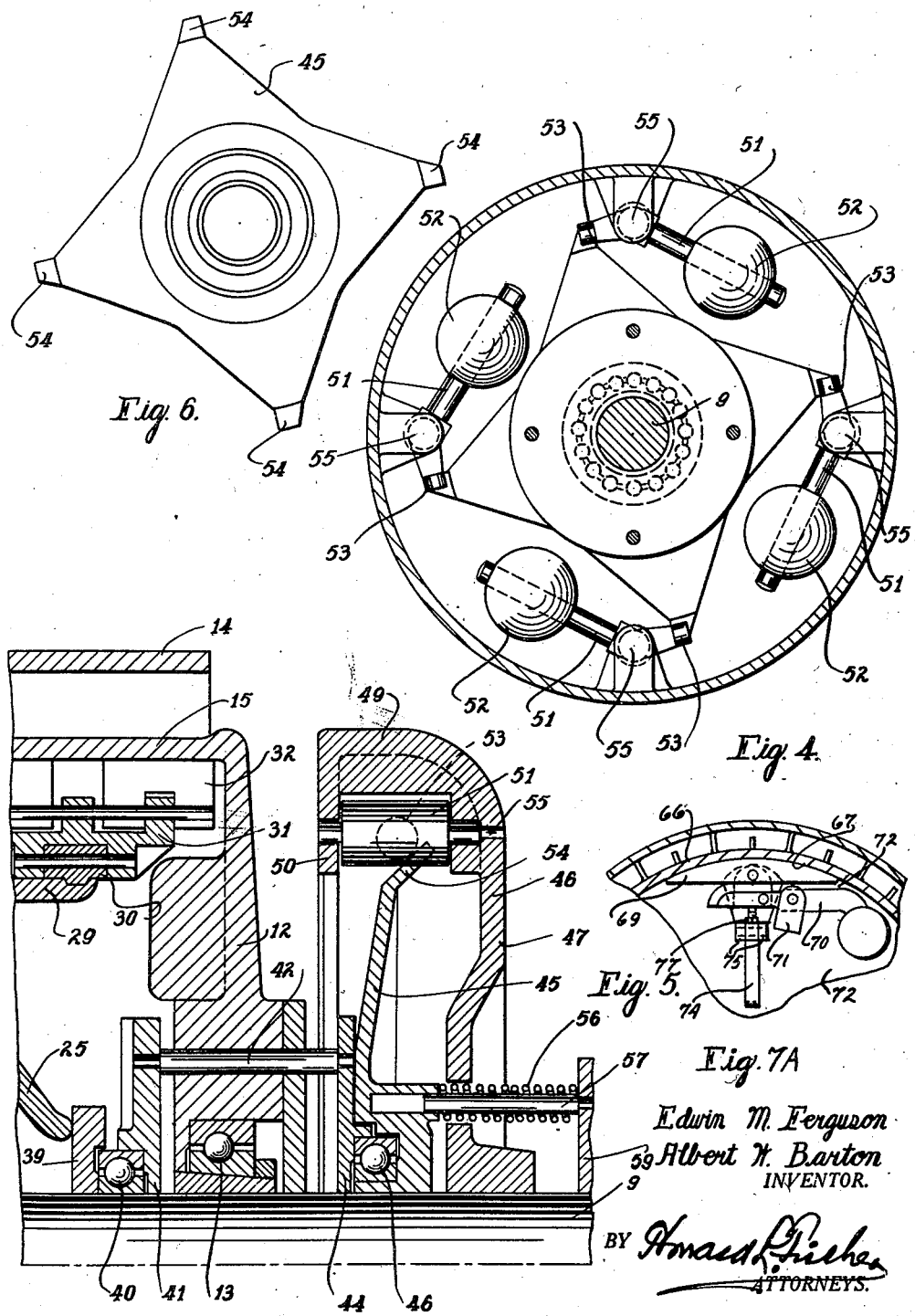

Dec. 22, 1942.  E. M. FERGUSON ET AL  2,306,158
VARIABLE SPEED TRANSMISSION AND AUTOMATIC TORQUE COMPENSATOR
Filed Oct. 25, 1939  3 Sheets-Sheet 3
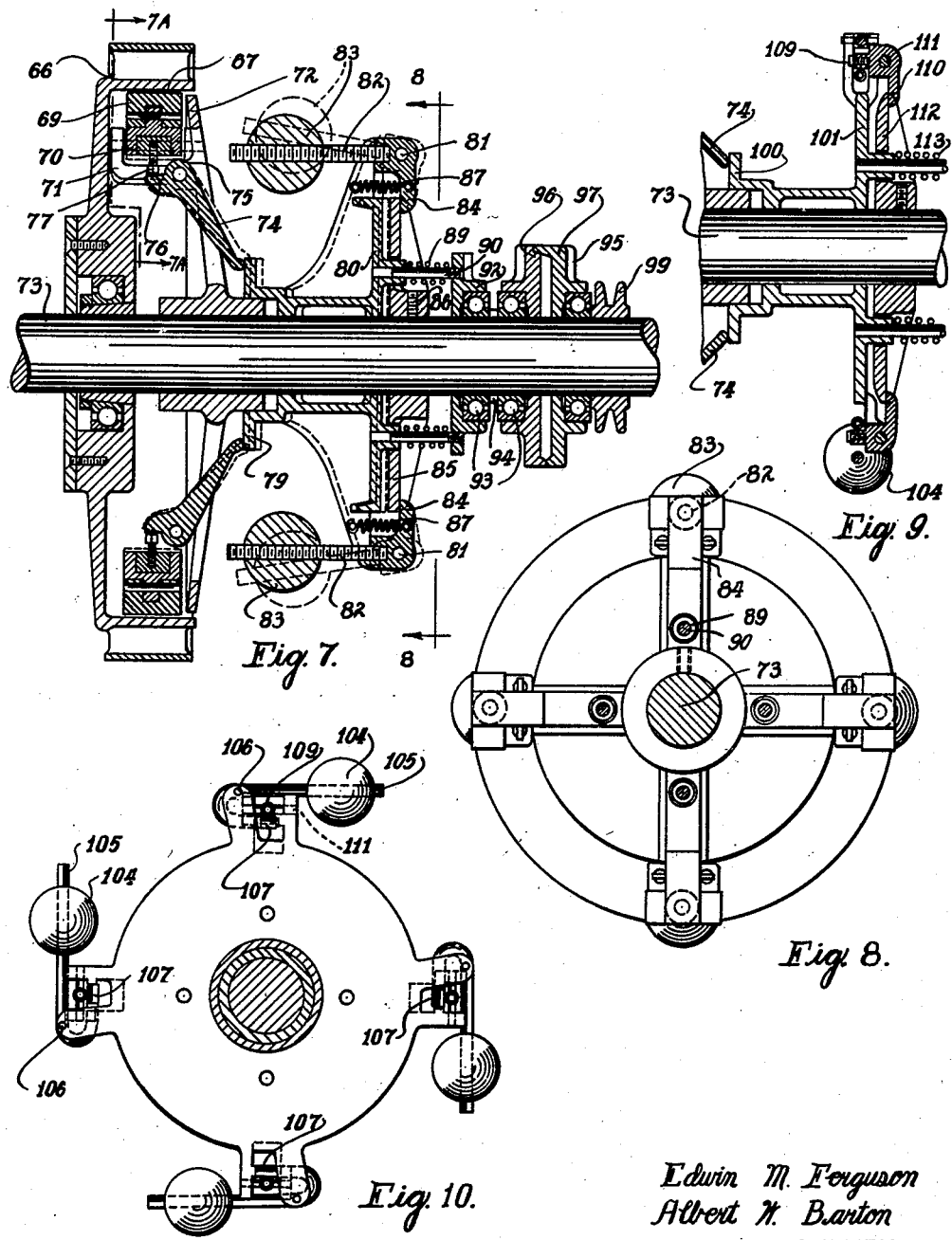
Edwin M. Ferguson
Albert W. Barton
INVENTOR.
BY
ATTORNEYS Patented Dec. 22, 1942

2,306,158

UNITED STATES PATENT OFFICE 2,306,158

VARIABLE SPEED TRANSMISSION AND AUTOMATIC TORQUE COMPENSATOR

Edwin M. Ferguson and Albert W. Barton, Minneapolis, Minn., assignors to Edwin M. Ferguson and Edmund Dulac, both of Minneapolis, Minn.

Application October 25, 1939, Serial No. 301,210

4 Claims. (Cl. 192—103)

Our invention relates to an improvement in variable speed drive mechanism of a type capable of maintaining a predetermined speed regardless of load changes within reasonable limits.

In our Patent No. 2,197,522, issued April 16, 1940, for "Variable speed driving mechanism," we described a type of pulley distinct from an ordinary friction clutch by governors capable of ironing out variations in substantially constant loads. This device was characteristically a device for transmitting uniform torque to a driven machine, except when used as a clutch operating at locked speed. When so used, it operated as any tight drive and the torque governors were without effect. In this prior construction, when the driven load increased, the speed decreased to deliver the same torque, and vice versa.

It is an object of the present invention to provide a power transmitter which is so constructed that the speed will remain constant over a wide range of torque load changes. This drive is so constructed that any change in torque demands of the driven machine operates to increase or decrease the torque transmitted to the driven shaft. Say, for example, that the driver is belted at 300 R. P. M. and the drive is adjusted so that the driven shaft rotates at only 100 R P. M. due to slippage of the friction surfaces. If the operating load changes twenty percent, a tendency to change the speed would be created, and such a load change would operate to instantly increase or decrease pressure on the friction connections and there would be no important change in speed of the driven shaft. When the torque changes are prolonged for a considerable period of time, the speed of the driven shaft will normalize at a slightly different speed. We have found, however, that even though a heavy increase in load were suddenly imposed and continued, the speed of the driven shaft will slow down only slightly, and would not stop.

It is an object of our invention to provide a compensating variable speed pulley similar in general to that described in the aforementioned patent, and to provide a separate compensator containing governor weights which varies pressure upon the friction connections in case of a change in torque load, acting to apply pressure against the friction applying devices much in the same way that this pressure would have been applied by hand in our previous application. Thus as the torque load tends to slow down the driven portion of the clutch, the governor weights in the external compensating device exert less pressure upon a spring actuated device, tending to increase pressure on the friction blocks, thereby acting to increase the friction of the friction blocks. With this increase in pressure against the friction blocks, the governor weights within the pulley are capable of compensating for the additional load and the driven shaft continues operation.

It is a feature of our invention that the external governors function only as compensators. Centrifugal force changes generated by these governors are transmitted to the bell cranks or friction connections controlling the pressure on the friction blocks, acting on a leverage of, for example, six to one to the friction blocks. Thus the external governors are capable of changing the pressure on the friction blocks a considerable extent to prevent stopping of the pulley under load changes. This construction has, in this manner, the ability to control, from an external point, the pressure upon the friction blocks just as this pressure would be controlled by hand in our former construction.

It is a feature of our invention that by use of external governors acting as compensators, load increases up to three and four hundred percent may be imposed upon the clutch without causing the clutch element to stall. Such heavy load increases will in extreme conditions result in a slowing down in speed, but the power transmitter will adjust itself to the changed speeds and continue to operate unless completely overburdened. Because the changes in speed are only slight in any case, the pulley may be considered a constant speed control.

The difference between the operation of our prior type of pulley previously referred to and the present construction will be clearer when it is understood that while the previous design of pulley was capable of operating at an intermediate speed of fifty percent below the belted speed, and continued to hold constant if the load is uniform, a slight increase in the load while so operating would cause the pulley to slow down. This slowing down will continue until the clutch element stalls unless additional friction pressure was manually applied by manipulation of the control handle.

Further, a heavy load could not be started up while the pulley was set for low speed of the driven shaft. With our compensating arrangement, however, this additional friction pressure will automatically be applied so that constant watching of the clutch will not be necessary.

These and other objects and novel features of our invention will become clear during the course of the following specification and claims.

In the drawings forming a part of our specification:

Figure 4 is a sectional view through the compensator, the position of the section being indicated by the line 4—4 of Figure 1.

Figure 5 is an enlarged sectional detail illustrating the manner in which force is transmitted from the compensator to the friction pulley.

Figure 6 is an elevational view of a detail portion of the compensator.

Figures 1, 2, 3:
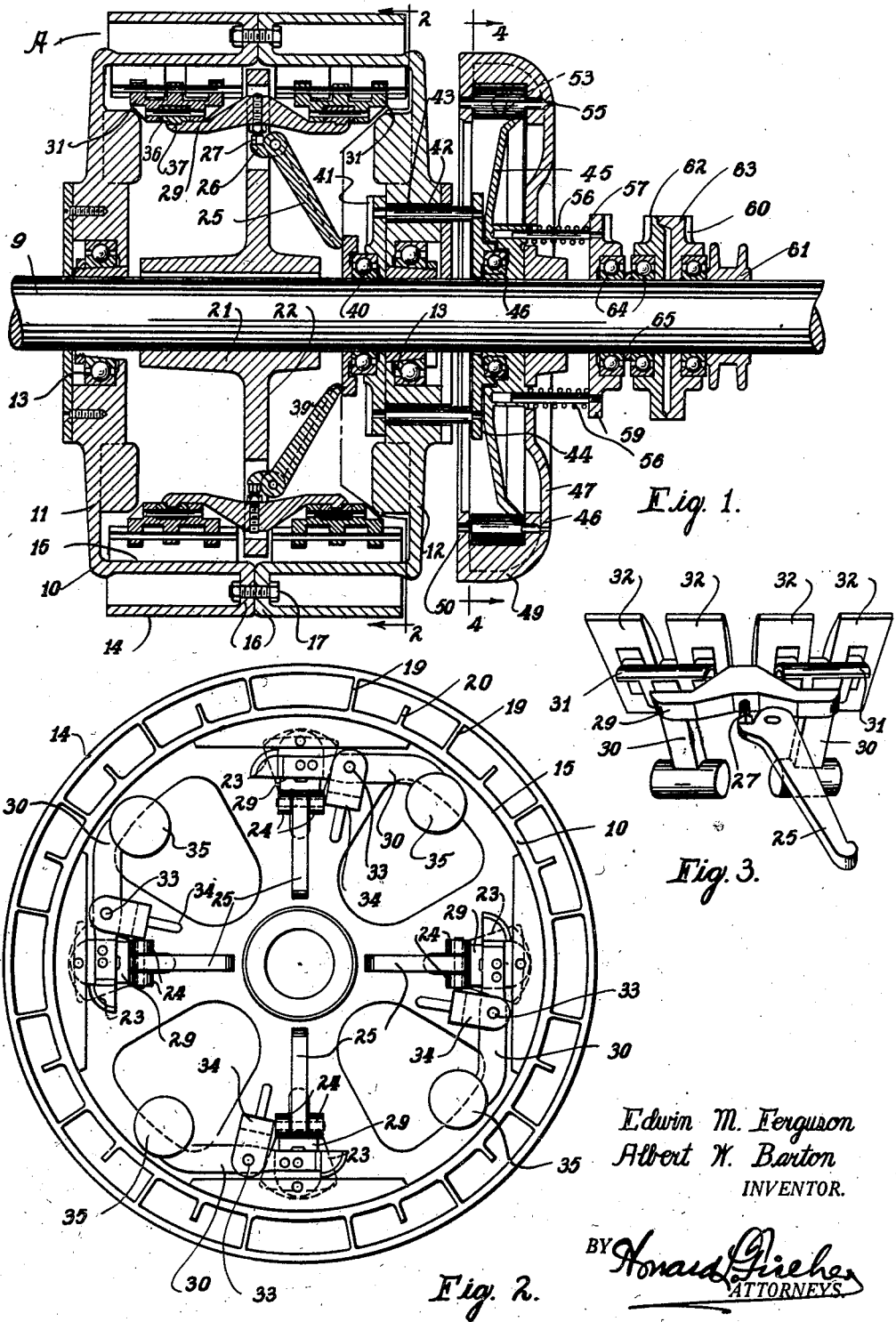
Figure 1 is a longitudinal cross-sectional view through our friction pulley and compensator illustrating the relationship of the various parts.
Figure 2 is a cross-sectional view through the friction pulley, the position of the section being indicated by the line 2—2 of Figure 1.
Figure 3 is a perspective view of the governor arm assembly used in the friction pulley.

Figure 7 discloses a modified form of construction of compensator and pulley embodying the same theory of operation as the construction disclosed in Figures 1 through 6.

Figure 7A is a sectional view taken through a portion of the pulley of Figure 7 to the left of the clutch shoes and the supports therefor.

Figure 8 is a sectional view through the pulley shaft, the position of the section being indicated by the line 8—8 of Figure 7.

Figure 9 is a sectional detail of another arrangement of governor weights from that illustrated in Figure 7.

Figure 10 is a sectional view similar to Figure 8, showing the weight arrangement in the compensator illustrated in Figure 9.

The pulley A includes a two part pulley casing 10 supported by opposed end spiders 11 and 12. These end spiders are rotatably mounted on the shaft 9 by means of ball bearings 13 or other suitable means so that the friction pulley 10 will rotate freely with respect to the shaft 9. A pulley surface 14 is supported in spaced relationship from the friction surface 15 of the pulley 10 by means of connecting webs 16 through which connecting bolts 17 extend to hold the two parts of the pulley together. The pulley surface 14 is also held spaced from the friction surface portion of the pulley by spaced air vanes 19 having cooling ribs 20 angularly spaced therebetween. The ribs 19 create a draft of air through the pulley between the friction surface portion 15 and the pulley surface 14 and convey heat away from the pulley. A suitable belt may be used for driving the pulley casing 10.

Intermediate the bearings 13 we provide a hub 21 to which is secured a radially extending spider 22. The hub 21 is keyed to the shaft 9 to rotate therewith. At angularly spaced points upon the spider 22, we provide apertures 23 having ears 24 on either side of the same. Bell crank levers 25 are pivotally supported between the ears 24 to pivot in planes through the longitudinal axis of the shaft 9. The short arm 26 of the bell crank levers 25 engages an adjusting bolt 27 on the yoke 29. Each end of the yoke 29 engages a weight arm 30 pivoted to a saddle 31. Each saddle 31 pivotally supports a pair of friction blocks 32 engageable against the friction surface 15 of the pulley 10. The weight arms 30 as best illustrated in Fig. 2 of the drawings are pivoted at 33 between brackets 34 and the body of the spider 22. These weight arms 30 are provided with a weight 35. The general arrangement of the weight arms, yoke, and bell cranks is best illustrated in Figure 3 of the drawings. It will be noted that the yokes loosely engage against the weight arms, a projection 36 on each arm engaging in a groove 37 in an end of the yoke 29. The bolt 27 freely engages the short arm 26 of the bell crank 25 and therefore pivoting of the bell crank distributes pressure equally to the weight arms 30 on both sides of the spider 22. Pressure of the yoke 29 passes through the weight arms 30 to the saddles 31 and from these saddles is distributed to the friction blocks 32.

A disc 39 is slidably mounted upon the shaft 9 and rotates therewith. Longitudinal pressure is transmitted to the disc 39, through a bearing 40 from a disc 41, rotatable with the spiders 11 and 12 supporting the pulley 10. As one portion of the anti-friction bearing 40 rotates with the shaft 9 and the other portion thereof rotates with the disc 41, pressure is transmitted between these plates with little friction. The disc 41 is moved longitudinally by angularly spaced pins 42 extending through suitable apertures 43 in the spider 12. These pins connect the disc 41 within the pulley housing with the disc 44 external of the pulley housing. Pressure in turn is exerted against the disc 44 by the cam plate 45 through the medium of an anti-friction bearing 46. The cam plate 45 is slidable along the shaft 9 but rotates in unison with the shaft 9, whereas the plate 44 rotates at the speed of the pulley housing 14.

The cam plate 45 may be moved axially along the shaft in two separate ways. This cam plate is enclosed within a compensator housing 46 which is keyed to the shaft 9. This housing 46 comprises an outwardly extending disc portion 47 terminating in a cylindrical rim portion 49 having an inturned flanged edge 50. Bell cranks 51 are pivoted within the rim of the compensator housing 46 between the flange 50 and the disc portion 47 thereof. On one end of each bell crank 51, we provide a governor weight 52 best illustrated in Figure 4 of the drawings. The other extremity of the bell crank 51 bears a roller 53 engageable with the inclined cam end 54 of the cam plate 45. From an observation of Figures 4 and 5 of the drawings, it will be apparent that as the speed of rotation of the cam plate and housing 46 increases, the weights 52 will be thrown outwardly, pivoting the bell cranks 51 about their pivots 55 and urging the rollers 53 toward the shaft 9. Inward movement of the rollers 53 acts against the inclined cam ends 54 of the plate 45 to slide the cam plate 45 to the right as viewed in Figures 1 and 5. This movement of the cam plate 45 acts to compress the springs 56 surrounding the pins 57 and interposed between the cam plate 45 and a pressure disc 59.

The pressure plate 59 may be slidably actuated along the shaft 9 by means of an expanding cam 60 rotatably secured on the shaft 9. A collar 61 on the shaft prevents movement of the expanding cam in one direction, but as the two parts 62 and 63 are relatively rotated by a suitable operating member, the portion 62 of the cam will be moved to the left as illustrated in Figure 1, acting through the bearings 64 and intermediate spacer 65 to move the plate 59 to the left, thereby compressing the springs 56. Compression of the springs 56 tends to urge the cam plate 45 to the left, which in turn moves the plates 44 and 41, connected by pins 42. This action moves the disc 39 to the left, which causes pivoting of the bell crank levers 25. Pivoting of these levers in a counter-clockwise direction acts to urge the yoke 29 against the weight levers, increasing the pressure of the friction blocks 32 against the friction surface 15 of the pulley.

It will be seen that by manipulation of the cam 60, which is preferably normally held fixed from rotation with the shaft 9, pressure may be placed upon all of the blocks 32. This pressure causes a predetermined tension in the springs 56 to be maintained. When the speed of rotation of the shaft 9 decreases, however, the weights 52 will move inwardly, thereby relieving the tension of the rollers 53 against the cam plate 45, and permitting the springs 56 to urge the friction shoes into closer contact with the friction surface 15. Thus as the torque load increases, the pressure tending to urge the shoes into contact with the friction pulley increases.

It should be noted that the springs 56 have sufficient tension to move the friction blocks into contact with the friction surface with a predetermined tension, and these same springs must also withstand the tendency for the cam plate 45 to be moved along the shaft 9 by the centrifugal force of the weights 52. When the outward force of the weights 52 is increased by an increase in speed, it is obvious that the springs will be compressed to a higher degree and the tension on the friction shoes will be consequently relieved to a certain extent. Conversely, when the centrifugal force tending to move the weights 52 outwardly decreases, the springs 56 are able to move the cam plate 45 to the left, thus increasing the tension on the friction surface 15. It will be seen that if the pulley portion 10 is rotated by a belt or other suitable means encircling the belt pulley 14, and there is a certain load on the shaft 9, the friction blocks 32 may be urged into contact with the friction surface 15 on the pulley to provide a desired speed of rotation of the shaft 9 to pull the desired load. If, however, the load on the shaft 9 should suddenly increase considerably, the shaft 9 will slow down very slightly, therefore causing the weights 34 on the weight arms to be urged outwardly with less force, and accordingly permit the friction shoes to engage the pulley surface more securely. As has been pointed out, however, this action alone is often not sufficient to prevent the shaft 9 from stalling, and therefore the springs 56 act to pivot the bell cranks 25 to increase the tension between the friction blocks and the pulley surface in the same manner as if the expandable cam 60 were manually operated.

In Figures 7 and 8 of the drawings, we disclose a similar construction which operates in the same manner. This construction discloses a pulley 66 which is provided with a friction surface 67 engaged by friction blocks 69 on weight arms 70. These weight arms 70 are similar in construction to the weight arms 30 illustrated in Figures 1, 2, and 5 of the drawings. The weight arms 70 are pivoted between a bracket 71 and a spider 72 secured to the shaft 73. A series of bell cranks 74 are pivoted between ears 75 on the spider 72 and the short arms 76 of the bell cranks 74 engage against adjusting bolts 77 on the weight arm 70. The bell cranks 74 are pivoted in unison by a slidable plate 79 integrally connected to a disk 80. The disc 80 is provided with a pivotal support 81 for a series of angularly spaced bell cranks 82. Weights 83 are secured to the longer end of the bell cranks 82, while the shorter ends 84 thereof engage against a fixed disc 85 secured by the set screw 86 or other suitable means to the shaft 73. Springs 87 tend to hold the arms 84 in contact with the fixed plate 85.

As the speed of rotation of the shaft 73 increases, the weights 83 are moved outwardly by centrifugal force, and the short arms 84 of the bell cranks 82 press against the fixed disk 85, sliding the slidable disk 80 and the disc 79 secured thereto to the right into the dotted position illustrated in Figure 7. This permits the bell cranks 74 to pivot in a counter-clockwise direction, relieving the frictional engagement between the friction blocks 69 and the friction surface 67.

The disc 80 is urged toward the full line position illustrated in Figure 7 by springs 89 surrounding pins 90 secured to the plate 92. The plate 92 is longitudinally slidable along the shaft 73 and may be moved longitudinally through the bearings 93 and the intermediate spacer 94. An expanding cam 95 contains relatively separable portions 96 and 97, the latter of which is held from movement longitudinally along the shaft by the collar 98. The expanding cam 95 is preferably fixed and does not rotate with the shaft 73.

When it is desired to place predetermined tension on the friction blocks 69, the portions 96 and 97 of the cam 95 are separated, acting through the bearings 93, spacer 94, and the plate 92 to compress the compression springs 89. The spring 89 urges the plate 80 and the disc 79 secured thereto to the left, as illustrated in Figure 7, pivoting the bell cranks 74 and urging the friction block 69 into closer contact with the friction surface 67.

When the speed of rotation of the shaft 73 is relatively high, the plate is moved close to the disc 85. When, however, an extra load is placed upon the shaft 73, the speed of rotation of this shaft decreases, permitting the weights 83 to move inwardly toward the shaft. This relieves some of the pressure of the arms 84 upon the plate 85, permitting the springs 89 to force the plate 80 and the disc 79 to the left to increase the tension of the friction blocks against the corresponding friction surface.

In Figures 9 and 10 of the drawings, we disclose a slightly different form of construction in which the principles of operation remain the same. In this construction, the bell crank 74 and shaft 73 are similar to those illustrated in Figure 7 of the drawings. These bell cranks 74 are urged in a clockwise direction by means of a disc 100 integrally secured to a disc 101 slidable on the shaft 73. Weights 104 are mounted on one end of each of the curved levers 105 pivoted at 106 to the disc 101. Rollers 107 are mounted on the other extreme end of the levers 105, which are engageable against one arm 109 of bell crank levers 110 pivoted at 111 to the disc 101. The other end of each bell crank lever 110 engages against a fixed plate 112. It will be seen that as the speed of rotation of the disc 101 increases, the weights 104 will be thrown outwardly, moving the levers 105 in a counter-clockwise direction about their pivots 106 as illustrated in Figure 10 of the drawings. This movement rotates the bell cranks 110 as will be seen from Figure 9 of the drawings, thus drawing the plate 101 closely adjacent the plate 112 against power of the compression springs 113. When the speed of rotation diminishes to some extent, the weights 104 move inwardly, permitting the spring 113 to separate the plates 101 and 112, acting to pivot the bell crank levers 74 in a manner to increase the friction between the friction blocks 69 and the friction surface 67.

In accordance with the patent statutes, we have described the principles of construction and operation of our variable speed driving mechanism, and while we have endeavored to set forth the best embodiments thereof, we desire to have it understood that obvious changes may be made within the scope of the following claims without departing from the spirit of our invention.

We claim:

1. A variable speed pulley comprising a cylindrical drum, a support mounted within said drum relatively rotatable with respect to said drum, lever means mounted on said support, friction shoe means mounted on said lever, governor weight means for pivoting said lever, spring means for urging said friction shoe means into contact with said cylinder, cam means associated with said spring means, means operable by the centrifugal force of said governor weight means for resisting a portion of the action of said spring means, and a separate governor means for actuating said cam to increase or decrease the tension of said spring means.

2. A variable speed drive mechanism comprising a rotatable drum, a relatively rotatable support, governor means including friction shoe means and supporting means secured to said friction shoe means and pivotally mounted on said support, means for pivoting said friction shoe means against said drum, spring means urging said pivoting means with spring tension, cam means varying the tension of said spring means including a plate axially transverse to and driven by the relatively rotatable support, and having portions of the surface inclined, and separate centrifugal governor means moveable in the plane of the cam plate and contacting the inclined portions thereof upon an increase of speed of said support to decrease the tension on said springs upon said pivoting means and operable upon a decrease of speed of said support to increase the tension of said springs upon said pivoting means.

3. A variable speed drive mechanism comprising a rotatable drum, a concentric relatively rotatable support, governor means pivotally mounted on said support including friction shoes engageable with said drum, means engageable with said governor means to pivot the same, spring means urging said pivoting means with tension, manually adjustable means actuating said spring means to vary the tension thereof, a second support rotatable with said first named support, and governor means pivotally mounted thereupon operable upon a decrease in speed to increase the pressure of said spring means upon said pivoting means.

4. A variable speed drive mechanism comprising a rotatable drum, a concentric relatively rotatable support, governor means pivotally mounted on said support including friction shoes engageable with said drum, means pivoting said friction shoes in unison against said drum, a shaft rotatable with said support, a cam slidable on said shaft to actuate said pivoting means, spring means urging said cam to press said friction shoes against said drum, a second support on said shaft, governor means mounted on said shaft, and means actuated by said governor means to resist a portion of the tension of said spring means and to compress said spring means upon an increase in speed of said shaft to decrease the pressure tending to force said friction shoes against said drum.

EDWIN M. FERGUSON.
ALBERT W. BARTON.